United States Patent [19]

Iizawa et al.

[11] Patent Number: 4,641,067

[45] Date of Patent: Feb. 3, 1987

[54] MOTOR CONTROL METHOD AND APPARATUS THEREFOR

[75] Inventors: Ryuji Iizawa; Koji Murakami, both of Tokyo, Japan

[73] Assignees: Fujitsu Limited, Kawasaki; Aisin Seiki Kabushiki Kaisha, Kariya, both of Japan

[21] Appl. No.: 774,843

[22] Filed: Sep. 11, 1985

[30] Foreign Application Priority Data

| Sep. 13, 1984 | [JP] | Japan | 59-192210 |
| Sep. 13, 1984 | [JP] | Japan | 59-192208 |
| Sep. 13, 1984 | [JP] | Japan | 59-192209 |
| Sep. 26, 1984 | [JP] | Japan | 59-201001 |

[51] Int. Cl.$^4$ ........................................... H02P 1/22
[52] U.S. Cl. ....................................... 318/287; 318/286; 318/280; 318/469; 49/28
[58] Field of Search ............... 318/286, 287, 289, 468, 318/256, 293, 430, 434, 469; 49/26, 28

[56] References Cited

U.S. PATENT DOCUMENTS

| 4,347,465 | 8/1982 | Goertler et al. | 318/286 X |
| 4,468,596 | 8/1984 | Kinzl et al. | 318/286 X |

Primary Examiner—William M. Shoop, Jr.
Assistant Examiner—Bentsu Ro
Attorney, Agent, or Firm—Armstrong, Nikaido, Marmelstein & Kubovcik

[57] ABSTRACT

The present invention discloses a technique to avoid catching a foreign object in a power window by detecting overload of the window drive motor and stopping or reversing the rotation of the motor in response to said detection. The reference value for detecting overload is updated in accordance with a actual load of the motor in each predetermined time interval $\Delta T$ but, in the present invention, when the start of an increase of overload is detected, the beginning of time period $\Delta T$ is started again from that time, and thereby detection of overload is always carried out within the shortest period. Moreover, a variety of check mechanisms are also provided for ensuring the fail-safe function of the apparatus and for enhancing reliability of the protective apparatus.

5 Claims, 15 Drawing Figures

| MODE | CONTROL SIGNAL | Tr (RL) | WINDOW |
|---|---|---|---|
| A | ① OFF (ON)<br>② OFF (ON) | Tr (RL) 1 OFF (ON)<br>Tr (RL) 2 OFF (ON) | STOP |
| B | ① ON<br>② OFF | Tr (RL) 1 ON<br>Tr (RL) 2 OFF | OPEN |
| C | ① OFF<br>② ON | Tr (RL) 1 OFF<br>Tr (RL) 2 ON | CLOSE |

FIG. 7 PRIOR ART

| MALFUNCTION | MODE CHANGE | WINDOW |
|---|---|---|
| Tr1 OPEN<br>(RL1- OFF) | B ⇨ A | UNABLE TO OPEN<br>(NOT-FAIL-SAFE) |
| Tr1 SHORT<br>(RL1- ON) | A ⇨ B<br>NO. C-MODE | UNCONTROLABLY OPEN |
| Tr2 OPEN<br>(RL2- OFF) | C ⇨ A | UNABLE TO CLOSE |
| Tr2 SHORT<br>(RL2- ON) | A ⇨ C<br>NO B-MODE | UNCONTROLABLY CLOSE<br>(NOT-FAIL-SAFE) |

MOTOR CONTROL METHOD AND APPARATUS THEREFOR

BACKGROUND OF THE INVENTION

The present invention relates to a motor drive control such as a safety or protection apparatus in an automatic opening/closing mechanism of a window, for example, for an automobile (hereinafter referred to as a power window).

With progress in the development of integrated circuit technology, electronic control apparatuses utilizing integrated circuit components are widely used in every corner of many industrial fields, and such electronic control apparatuses are also employed for engine control, display of vehicle speed and opening or closing of windows of vehicles, particularly of automobiles.

A power window system for automatically opening and closing the windows of vehicles from the driver's seat is already widely put into practical use. In such a power window system, the window is opended or closed by the operation of a switch. If a driver's hand is caught by the window during the closing operation, said window must be opened by opening the window through operating the switch. However, in order to prevent an accident to a child by mischief, it is required that the window be automatically opened by detecting that a foreign object is caught by the window.

Therefore, a safety apparatus for reversely controling the operation of a power window to the opening mode when it detects an excessive load applied on the power window in the closing mode is under investigation at present.

In such a load detection method of this safety apparatus, it is essential to individually detect factors such as the road condition when a car is running, wind pressure applied on the window, change of load due to the play of mechanical parts and change of load due to the catching of a substance or a hand, etc.

If a hand is caught, it must be detected as quickly as possible. This safety apparatus is generally controlled by a micro-computer and therefore it is desirable that a control algorithm or process which alleviates the processing load for the microcomputer as much as possible be developed.

Moreover, such safety apparatus is required to always assure and guarantee the safety of operation even under any operating condition.

For example, it is not permissable that the safety operation be lost by a failure even if such failure occurs at a part of the safety apparatus. Therefore, advent of a safety apparatus which ensures safe operation even if a major component fails has long been desired.

OBJECT AND SUMMARY OF THE INVENTION

It is a general object of the present invention to provide a motor control method and an apparatus for detecting overload condition with high accuracy, high speed and high reliability.

It is another object of the present invention to provide a motor control system which always can set the optimum reference value for detecting overload in accordance with fluctuations of motor load.

It is a further object of the present invention to provide a motor control system which controls a motor on the basis of fail-safe concept even if a structural component of the motor control system fails.

It is a still further object of the present invention to provide a safey apparatus for motor control with high reliability, and particularly an apparatus which assures the safe function even if an operator executes any switch operations during the functioning of the safety apparatus.

These objects are attained by setting the reference value for detecting overload synchronously with fluctuations of actual motor load. The present invention will be explained in detail with reference to the accompanying drawings.

DESCRIPTION OF THE PRIOR ART

Figure 1:
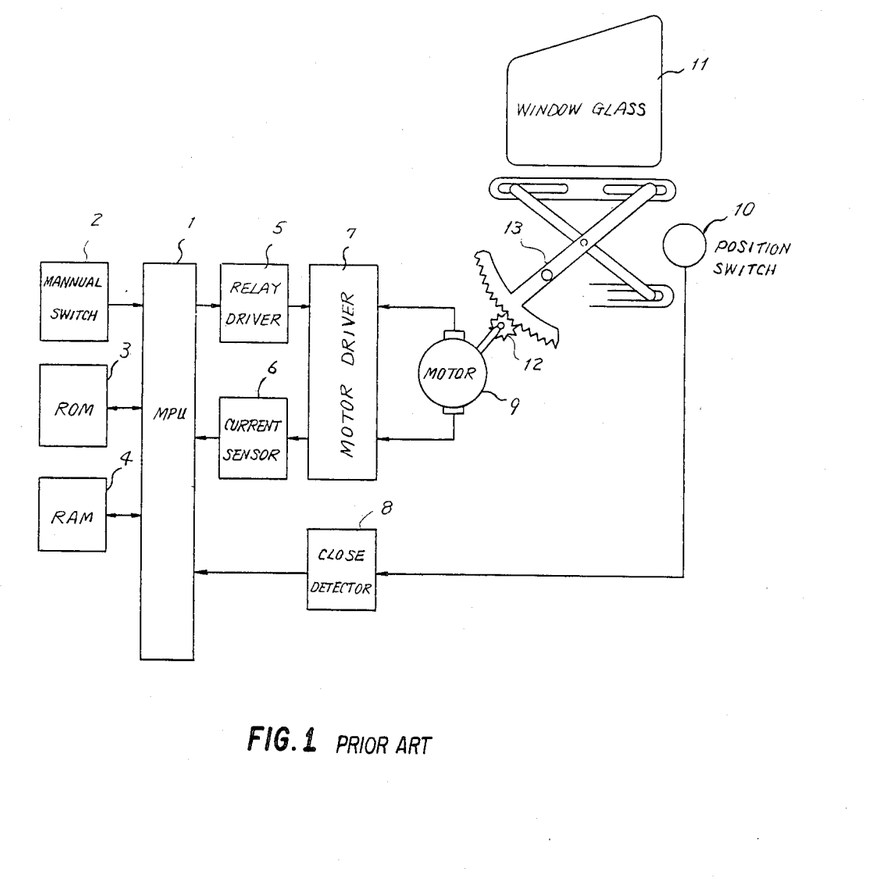
FIG. 1 is a block diagram of hardware of a power window control apparatus of the prior art.

FIG. 1 shows a block diagram indicating a prior art type of safety apparatus for a power window system. When a hand or obstacle is caught by the power window during the closing operation, an excessive load applied on said window is detected from occurrence of a change of current flowing in a drive motor, and the drive motor is switched to opening operation.

In the same figure, 1 denotes a microprocessor (hereinafter referred to as MPU), 2 is a window opening/closing manual switch, 3 is a ROM (Read-Only-Memory), 4 is a RAM (Random-Access-Memory), 5 is a relay driver which changes polarity of a DC voltage applied to a relay in the motor driver for determining rotating direction of motor 9, 6 is a current sensor for detecting current of motor 9, 7 is a motor driver including said relay, 8 is a close detector which detects that the window closes properly owing to a position switch 10 which detects that the window glass 11 has reached the proper closing position, 9 is a motor which drives the lift arm 13 with a gear 12, 11 is a window glass.

In the safety apparatus with the structure described above, the window opening/closing operations are carried out as explained below.

When a non-locking type opening or closing manual switch 2 is depressed, MPU 1 controls the relay driver 5 and thereby the motor 9 rotates in the determined direction while the switch is being depressed. When the motor rotates, the lift arm 13 also rotates through the gear 12, causing the window glass 11 to move vertically.

In general, a current flowing into the DC motor 9 and a torque have a proportional relation. Therefore, if a load is applied on the window glass 11, a large current flows into the motor in accordance with said load.

The safety apparatus utilizes such occurrence of increased current. Namely, the drive of the DC motor 9 is controlled by sensing a current value of DC motor 9 with a motor current sensor 6.

Meanwhile, an operation signal for the window glass 11 is input to the MPU 1. Namely the operation signal "OPEN" or "CLOSE" is sent to the MPU 1 from the manual switch 2. This operation signal is detected by the programs in the MPU 1, memory RAM 4 and the memory ROM 3. Thereby, the DC motor 13 is driven and controlled in the "OPEN" or "CLOSE" direction through the relay driver 5.

On the basis of the motor current characteristic shown in FIG. 2 and the flow diagram of the control program shown in FIG. 3, the "CLOSE" operation of the automatic opening/closing apparatus will be explained.

Domain (a):
The safety apparatus does not yet detect abnormal condition. The "CLOSE" operation signal is input to the MPU 1 by operating the "CLOSE" manual switch 2.

Domain (b):
The "CLOSE" operation signal is input to the MPU 1. Thereby, the MPU 1 drives the relay driver 5, starting drive control of motor 9 and setting the close detector 8 to the input condition. When dirve control of motor 9 is started, a transient current shown in FIG. 2 momentarily flows.

Domain (c):
After the transient current disappears, the protective function operation range of the safety apparatus starts. Namely, a drive current of motor 9 flows at almost a constant level.

Domain (d):
When the window glass 11 comes near the "CLOSE" condition, the position switch 10 becomes ON and a motor current I increases because load increased due to the friction with the rubber bracket and thereby the motor 9 is directed to the lock condition.

When the motor 9 is locked after input of the ON signal of positon switch 10 through the close detector 8, the MPU 1 stops the drive of relay driver 5. Thereby the motor current value I returns to the condition of Domain (a).

Here, the lock condition means that rotation of the motor stops and motor current becomes maximum.

Figure 2:
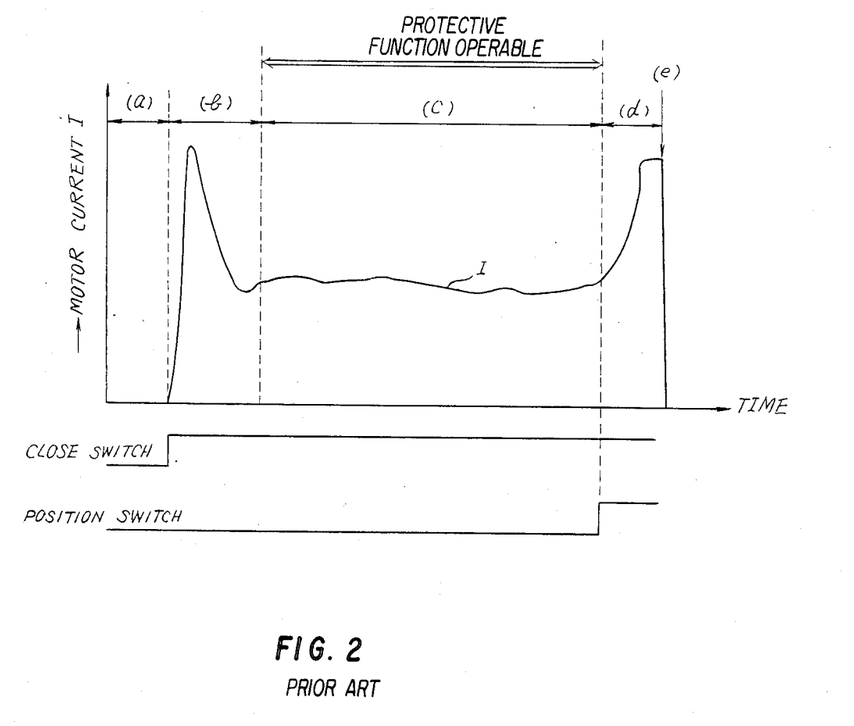
FIG. 2 shows the current characteristic of a motor.
Figure 3:
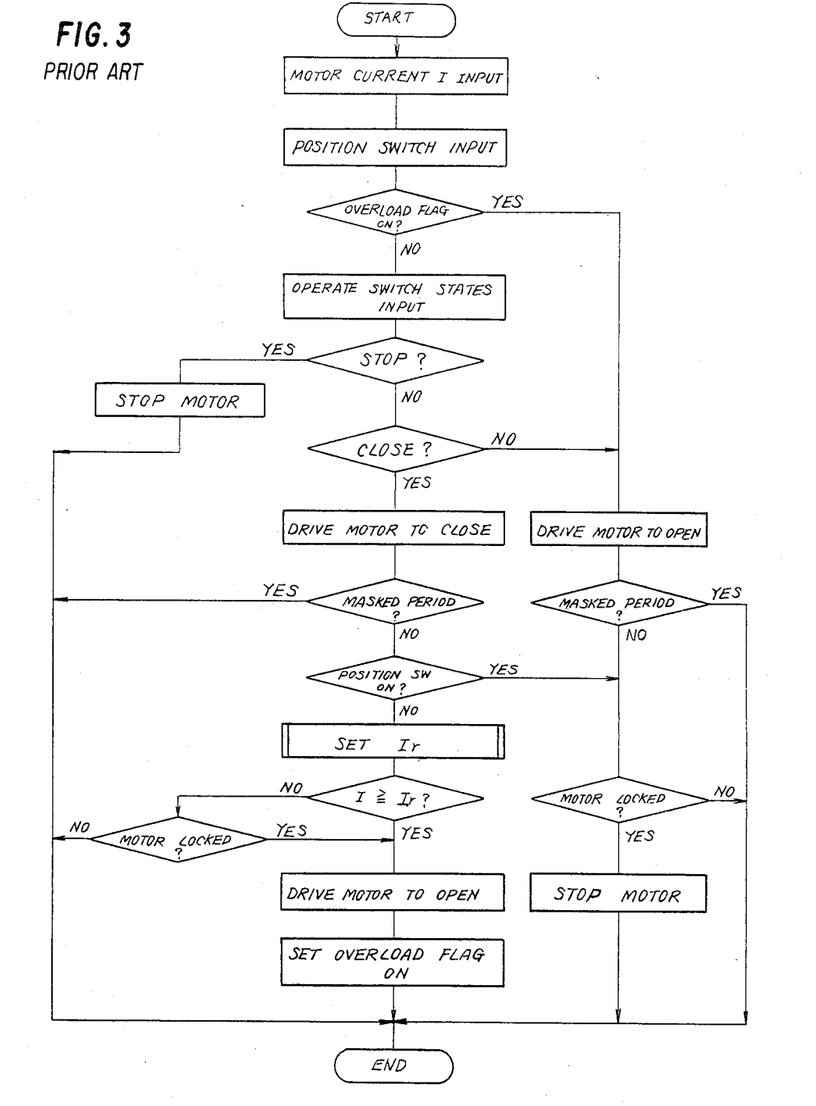
FIG. 3 is a flow chart of a control program in the prior art system.

FIG. 3 is an outline of a flow chart of a conventional control program executed by the MPU 1. The "MASKED PERIOD?" in the same figure means the step for discriminating the domains (b) and (d) and the domain (c) in FIG. 2. In the domains (b),(d), the function for detecting abnormal motor current is masked and is not executed. The domain (b) is recognized from the fact that the time is within a constant period from start of domain (b) or within a constant period from peak detection after start of the domain (b). The domain (d) is detected by the position switch.

The "SET OVERLOAD FLAG" in FIG. 3 means the step for recording that an abnormal motor current is detected in the flag area provided in the RAM 4.

The routines of FIG. 3 are repeated, for example, every 10 msec. In response to a start signal issued every 10 msec. from TIMER, motor current I is sensed by current sensor 6 and window position switch is sensed by detector 8. If the overload flag is YES, relay driver 5 is set to drive the drive motor to OPEN. If MASKED PERIOD? is YES to indicate masked domain (b) or (d), the routine ends; if MASKED PERIOD? is NO, then MOTOR LOCKED state is determined from current sensor 6 and if it is YES the motor is stopped, if NO the routine ends.

If the overload flag is NO, the state of the manual operate switch 2 is sensed; if STOP? is YES, the motor is stopped and routine ends; if STOP? is NO and CLOSED? is NO (i.e. OPEN), the DRIVE MOTOR TO OPEN subroutine above is followed; if close? is YES, the drive motor is driven to close and MASKED PERIOD? is sensed. YES ends routine, NO senses whether position switch 10 is ON. If POSITION SWITCH ON? is YES, the MOTOR LOCKED? subroutine is followed; if NO the SET Ir subroutine of FIG. 4 is initiated.

Motor circuit I is compared with Ir and if I is NO (not greater than or equal to Ir) the MOTOR LOCKED? state is determined; if this is NO the routine ends and the drive motor remains on CLOSE. If I is YES (greater than or equal to Ir) or if MOTOR LOCKED? is YES, an overload is indicated and the drive motor is changed to OPEN, overload flag is set ON and the routine ends.

Next, the reference value Ir setting condition for detecting abnormal motor load under the domain (c) will be explained with reference to FIG. 4 and FIG. 5.

Figure 4:
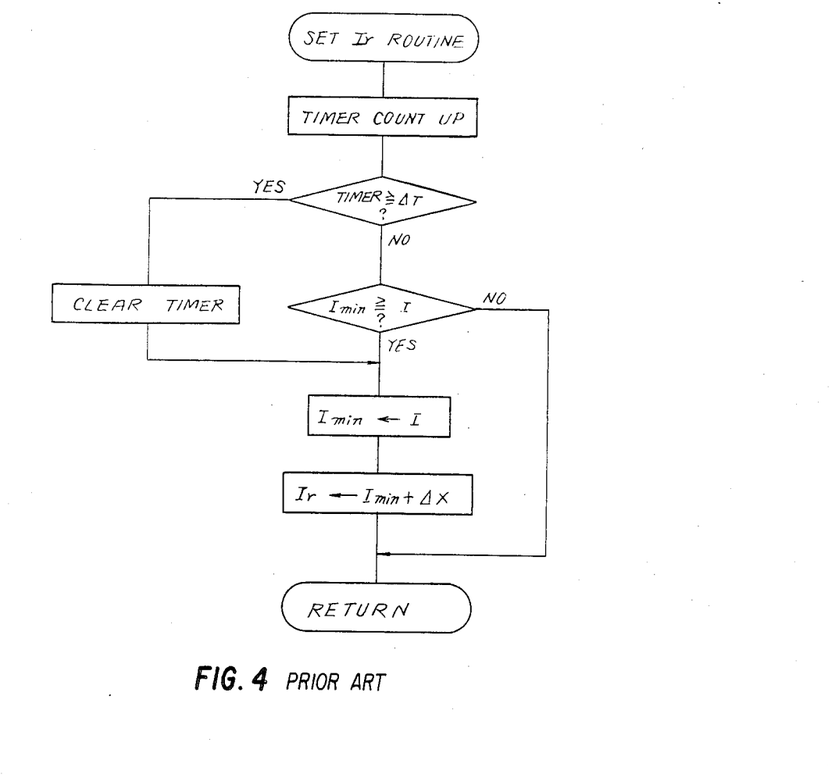
FIG. 4 is a flow chart of a reference value setting routine of the prior art system.
Figure 5:
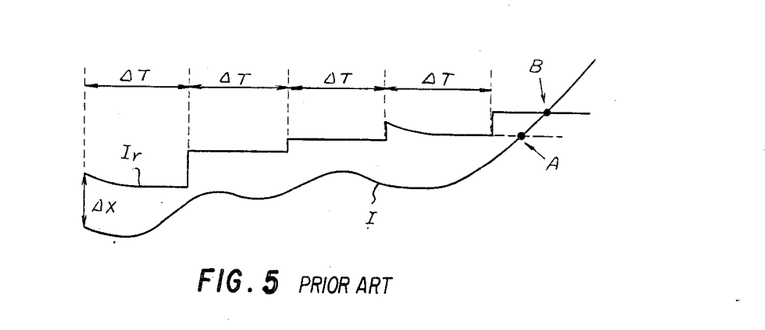
FIG. 5 is a diagram for explaining operations indicated by the flow chart of FIG. 4.

FIG. 4 shows a flow chart of a control program for a conventional reference value setting method for detecting abnormal motor current and FIG. 5 shows the relation between detected abnormal value Ir and motor current value I.

As shown in FIG. 5, a motor current value I is repeatedly input to the MPU 1 every 10 msec from the current sensor 6, and a minimum current value $I_{min}$ that occurs within a constant time period $\Delta T$ is added to a fixed difference value $\Delta X$ and the sum $Imin + \Delta X$ is set as the new reference value Ir for detecting abnormal motor load. $\Delta T$, is, for example, about 300 msec. When a motor current value I exceeds the reference value Ir within the period $\Delta T$, the MPU 1 reverses the motor 9 to the "OPEN" control mode.

The program routine of renewal processing for the reference value Ir is shown in FIG. 4. A timer region, Imin region and Ir region are assigned in the RMA 4. The routine of FIG. 4 is repeated for every constant period which is sufficiently smaller than $\Delta T$, for example, 10 msec.

First, the counting of the timer region of RAM 4 is started up to begin a time period $\Delta T$. During the period for the timer to reach $\Delta T$, a detected motor current value I is repeatedly compared with a value of Imin stored in the region of RAM 4. When I>Imin, this routine completes. When Imin≧I, the content of the Imin region of RAM 4 is replaced with a new value of I at this time. $\Delta X$ is added to the replaced Imin and the content of the Ir region of RAM 4 is replaced with the result of such addition. When the period of the TIMER≧$\Delta T$, comparison between Imin and I is stopped and Imin and I are immediately renewed after which the procedure is repeated for the next $\Delta T$.

The practical circuits of relay driver 5, current sensor 6 and motor driver 7 shown in FIG. 1 are explained with reference to FIG. 6. The same circuits are given the same numerals as those in FIG. 1.

When the signals 1 and 2 output from the MPU 1 are OFF, the current flowing through the transistors Tr1, Tr2 and the relays L1, L2 are connected to the side shown by the solid line and the DC motor 9 is not driven.

When the signal 1 turns ON, Tr1 and L1 also turn ON, setting the contact RL1 to the side of the broken line and the DC motor 9 is driven. In this case, a current condition is sensed by a current sensor resistor Rs, amplified by an operational amplifier AMP and is then sent to the MPU 1.

When the signal 2 turns ON, Tr2 and L2 turn ON, setting the contact RL2 to the side of the broken line and the DC motor 9 is driven in the reverse direction from the direction when the signal 1 is ON.

Namely, if the wiwndow "OPEN" operation is carried out when the signal 1 is ON, the "CLOSE" operation is carried out when the signal 2 is ON. Such conditions are indicated as the operation modes A-C shown in FIG. 7. When both signals 1 and 2 are ON or OFF, drive of the DC motor 9 is stopped.

DISADVANTAGES TO BE SOLVED BY THE PRESENT INVENTION

The conventional power window safety apparatus explained above has a first problem that when the reference value Ir is reset by the method explained above, since the reset timing is not related to fluctuations of motor current value. An increase of motor load must be detected intrinsically at the point A (FIG. 5) but such an increase is not detected until the point B if the reference value Ir is reset immediately before the point A, and thereby detection of the increased load is delayed for a time period as long as the difference between the points A and B in FIG. 5.

The second disadvantage is that if a finger, for example, is caught during the "CLOSE" operation of the window glass 11 and thereby a current higher than reference value Ir is detected, the safety apparatus starts normally as explained above but if a driver turns OFF the CLOSE signal by operating the manual switch 2 just before the point B shown in FIG. 5, the motor 9 stops with a certain inertia and simulatenously the function of the safety apparatus also stops, keeping the finger caught.

The third disadvantage is that if the sensing system for sensing an increment of current fails and an increase of current matching the increment of load cannot be obtained, normal operation is lost, namely the fail-safe mode is not satisfied.

The fourth disadvantage is that the safety apparatus operating in this operation mode substantially loses the protective function thereof, and the degree of safety in operation is decreased if any one of the components such as Tr1, Tr2, L1 and L2, etc. fails.

Figure 7:
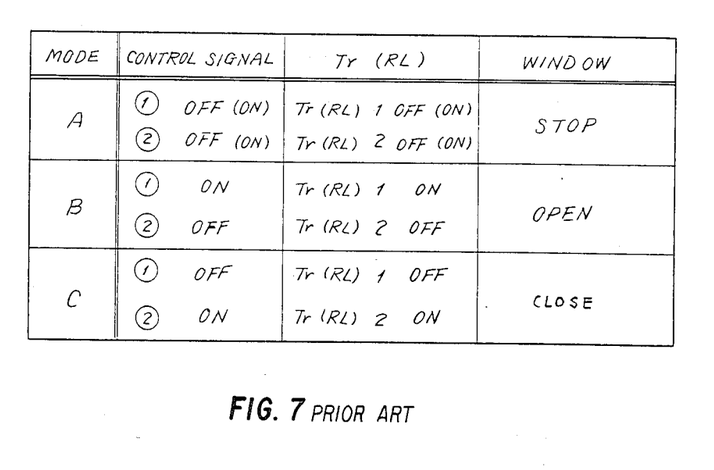
FIG. 7 is a table indicating operation mode of FIG. 6.
Figure 8:
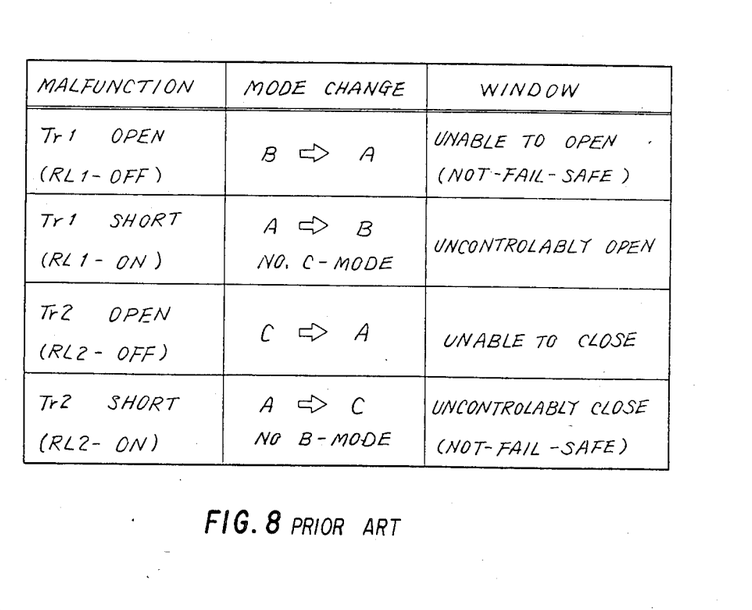
FIG. 8 is a table indicating failure mode of FIG. 6.

The malfunction mode of components is shown in FIG. 8. In FIG. 8, the left column indicates the malfunction and the center column indicates the mode change condition from A to C of the operation modes in FIG. 7.

For example, if a failure occurs, namely, if a transistor Tr1 fails or a coil of relay L1 fails, the window no longer opens. Meanwhile, if a transistor Tr1 is short-circuited or contact RL1 of relay L1 is short-circuited, the window opens suddenly.

In the same way, if a transisitor Tr2 or relay 12 opens, the window no longer closes, and if these are short-circuited, the window closes suddenly. Particularly when Tr1 and relay L1 open while Tr2 and relay L2 are short-circuited, the protective function stops, resulting in a dangerous condition.

PREFERRED EMBODIMENT OF THE INVENTION

An embodiment of the present invention will be explained with reference to the drawings.

Figure 9A:
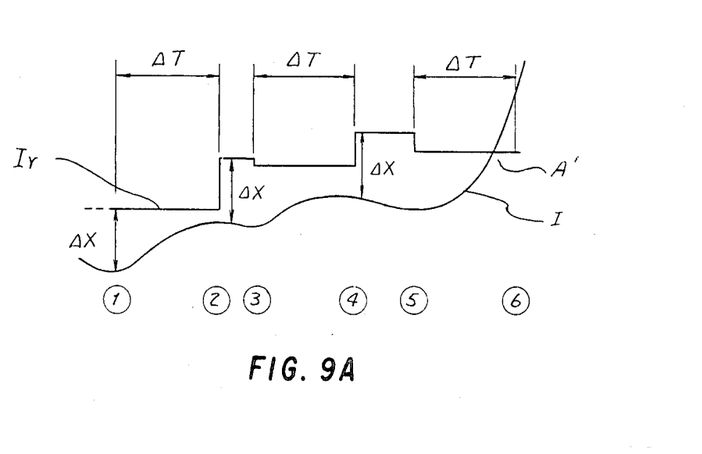
FIGS. 9(A) and 9(B) show diagrams for explaining the method setting the reference values in the present invention.
Figure 9B:
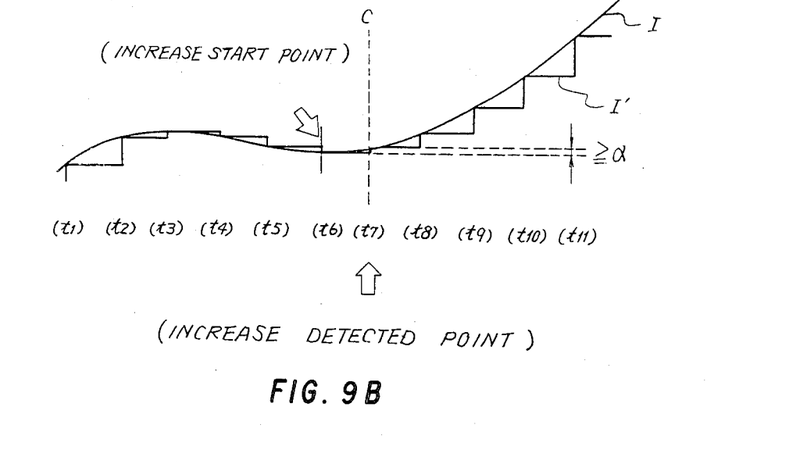

FIGS. 9A and 9B show characteristic diagrams indicating an embodiment of a DC motor control method of the present invention.

Like components are given the same numerals throughout the drawings.

In this embodiment, a reference value Ir is set as shown in FIG. 9(A). Namely, the MPU 1 continously monitors change of motor current value I through the current sensor 6. When it detects the start of an increase of current at the point 1 , the MPU 1 adds $\Delta X$ to I at this time and sets the detected abnormal motor load reference value Ir.

Thereafter, if a current value I does not exceed the reference value Ir even after the time $\Delta T$ (point 2 ), the reterence value Ir is set again at this point. Moreover, when the start of an increase of current I is detected within the period $\Delta T$, (point 3 ), the reference value Ir is set again and a new $\Delta T$ time period is begun.

As shown in FIG. 9(B), motor current I in the period $\Delta T$ (for example, periods 2 ~ 3 ) is measured at sampling periods $(t_1)-(t_{11})$ every 10 msec and any difference between adjacent sample values is detected by the MPU 1. When an increase of current is detected and the difference is larger than a predetermined value $\alpha$ during any 10 msec sampling period (for example, at the point of timing $t_7$), a new value, obtained by adding $\Delta X$ to the detected sample value, is reset as the new reference value Ir and the time count of $\Delta T$ is cleared to zero and the counting is started again.

Thereby, the start of the period $\Delta T$ is synchronized with the start of any increase of motor current I and the detection of motor current overload is always accomplished within one period $\Delta T$. Accordingly, an abnormal load can be detected within the shortest period.

Here, countermeasures for the second disadvantage will be explained. In order to prevent a substance to be left caught because the switch is operated just before detection of abnormal motor current and thereby the window glass is stopped, the switch operation is disabled just before the abnormality is detected. To this end, in the present invention, an extra reference value Ir' which is smaller than the reference value Ir for detecting abnormality by a predetermined value is established. When motor current I exceeds the reference value Ir', the switch operation is disabled.

It is enough that the extra reference value Ir' is set to $I+\Delta X'$ (where $0<\Delta X'<\Delta X$) while Ir is $I+\Delta X$ and the renewal timing of Ir' may be determined the same as that of Ir.

If motor current exceeds the extra reference value Ir' but does not exceed the reference value Ir within the predetermined period ($\Delta t$), the switch operation is effectuated on the supposition that an abnormal condition may not be generated. $\Delta t$ is a constant value smaller than $\Delta T$.

Then, countermeasures for said third disadvantage, namely for failure of the current sensor 6 will be explained.

In the period (c) of FIG. 2, if a current I actually detected is significantly smaller than the expected current value, it can be considered as a failure of current sensor 6. On the other hand, it is also possible that a current I may seem to be too large. In this case, the protective function of the motor control works, thereby eliminating the problem.

Therefore, a failure of current sensor 6 can be detected by previously determining a lower limit value $I_g$ of a current value I and then comparing a current value I with $I_g$. In this case, the motor is stopped if I is less than $I_g$.

Then, countermeasures for said fourth disadvantage, namely, a failure of a motor drive component, will be explained. In FIG. 6, a comparatively heavy current and a high voltage are applied on the power transistors Tr1, Tr2 and failure rate of these components is higher than that of the MPU, etc.

The relay coils L1, L2 and contacts RL1, RL2 are externally provided mechanical parts also having a high failure rate. Failure of these components can be detected by utilizing the fact that a motor current does not normally flow when the relay contacts RL1, RL2 are set to the same polarity side of the power supply voltage. For example, when the drive commands 1 and 2 sent from the MPU 1 are turned ON before starting the drive of motor and both RL1 and RL2 are set to the side shown by the broken line, if any one relay is inoperable, a current with flow into the motor. Therefore, a failure of a relay or power transistor can be determined by detecting a current I by means of current sensor 6 at a very short period ($\Delta T_1$) after turning ON the signals 1 and 2.

If a failure occurs during motor drive operation, the motor may immediately stop, or the motor may not stop even when the drive signals 1 and 2 are turned OFF, or the failure may not be detected virtually in accordance with a failure mode. In the first case, there is no particular safety problem. In the second case, it is detected that the current I has not reduced below a predetermined value (for example, zero) within a predetermined time period ($\Delta T_2$) from turning OFF the drive 1 and 2 and both signals 1 and 2 are turned ON and thereby the motor can be stopped. In the third case, a failure can be detected by checking motor current just before driving the motor the next time.

Each function can be realized respectively by providing exclusive hardware. However, in practice, it is better to realize the result by modifying the processing program. The flow chart of a processing program of the embodiment of the present invention is explained with reference to FIG. 10. The hardware structure for performing the process of the present invention is basically the same as that of the prior art shown in FIG. 1.

Figure 10:
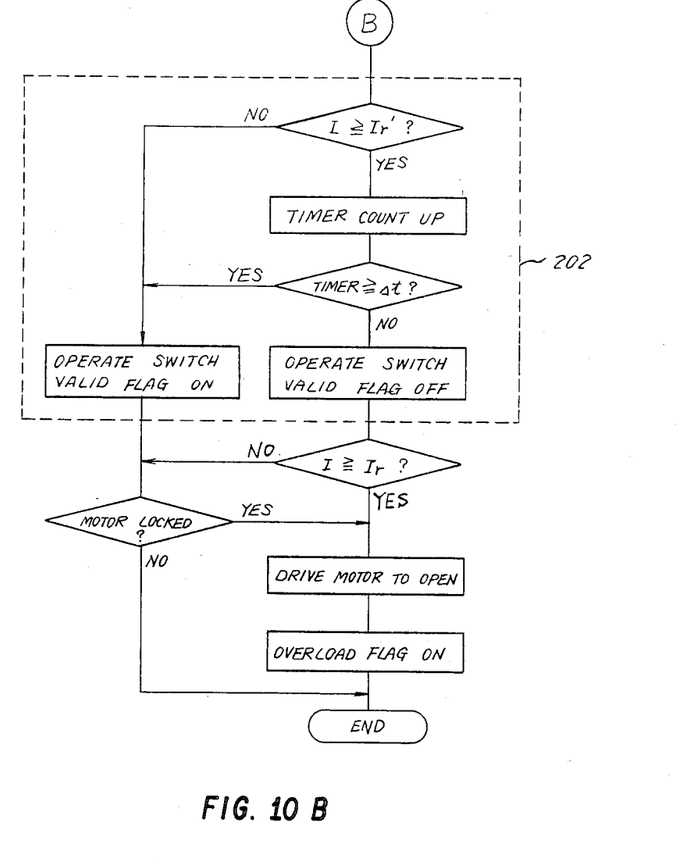
FIGS. 10(A) and 10(B) show a flow chart of a control program of an embodiment of the present invention.
Figure 10A:
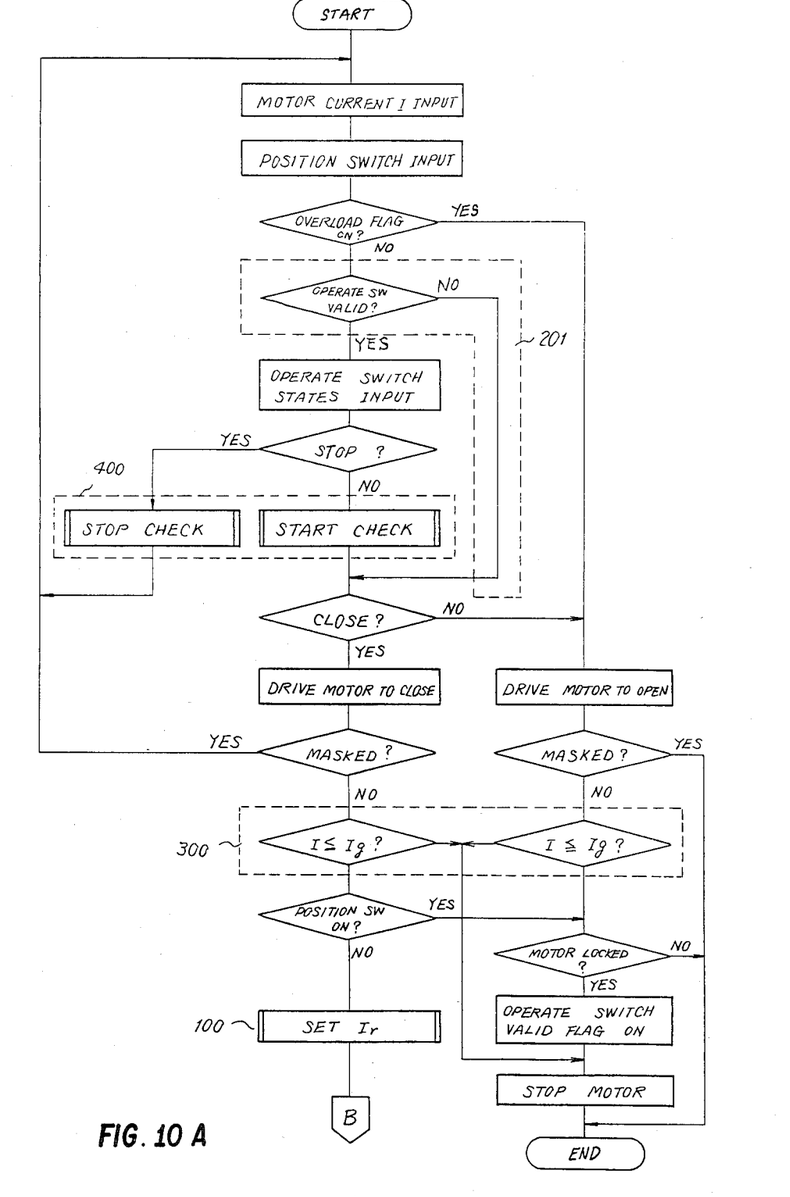
Figure 11:
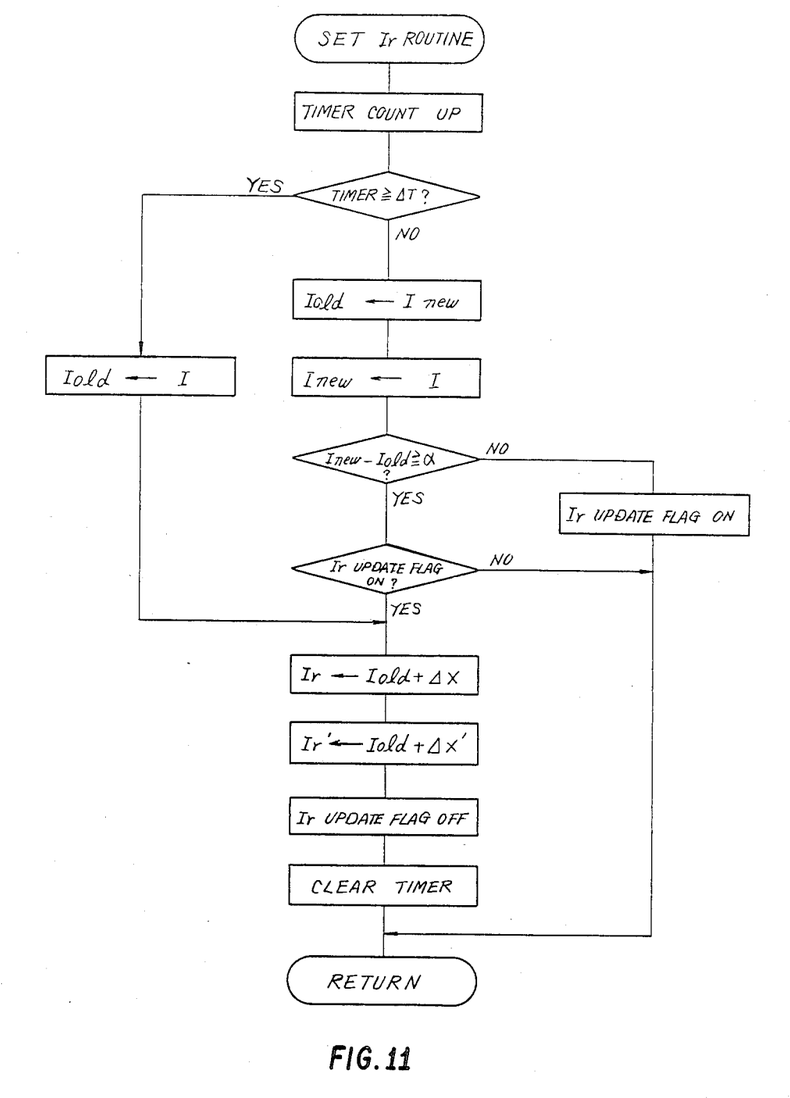
FIG. 11 and FIGS. 12(A) and 12(B) show detail flow charts of subroutines in FIG. 10.

The differences betwen FIG. 10 and prior art FIG. 3 are that the step 100 is modified and the steps 201, 202, 300 and 400 are added. The routine of FIG. 10 is executed, for example when it is called in every 10 msec. The component 100 is a subroutine and details of it are shown in FIG. 11. This is for overcoming the first disadvantage described above. Steps 201 and 202, 300, and 400 of FIGS. 10(A) and 10(B) shown outlined in dashed lines are for overcoming the second, third and fourth disadvantages, respectively. The functioning of each of these steps has been described above.

FIG. 11 is a flow chart of a program subroutine for executing the processing of FIGS. 9(A) and 9(B). In order to execute this routine, the timer count region, Ir region $I_{old}$ region, $I_{new}$ region, Ir UPDATE FLAG region are assigned respectively in the RAM 4.

First, the timer count region is read and the count is determined. When the content of TIMER is smaller than $\Delta T$, the content of $I_{old}$ is replaced with the content of $I_{new}$ and the content of $I_{new}$ is replaced with the current value of I. In the case where a difference of updated $I_{new}$ and $I_{old}$ is larger than the predetermined value $\alpha$, reference is made to the Ir UPDATE FLAG. When it is ON, the content of Ir is replaced with $I_{old} + \Delta X$ and Ir' is replaced with $I_{old} + \Delta X'$. Then, the Ir UPDATED FLAG is set to OFF and the timer count region is cleared to zero. Ir' and $\Delta X'$ will be described later. If TIMER exceeds $\Delta T$, $I_{old}$ is replaced with current I and simultaneously Ir is replaced with $I_{old} + \Delta X$. Succeeding processings are the same as those descirbed above. If the difference between $I_{old}$ and $I_{new}$ is smaller than $\alpha$, the Ir UPDATE FLAG is set to ON and then this subroutine terminates. Even when the difference between $I_{old}$ and $I_{new}$ is larger than $\alpha$, if the Ir UPDATE FLAG is not set to ON, Ir, Ir' are not updated.

Figure 6:
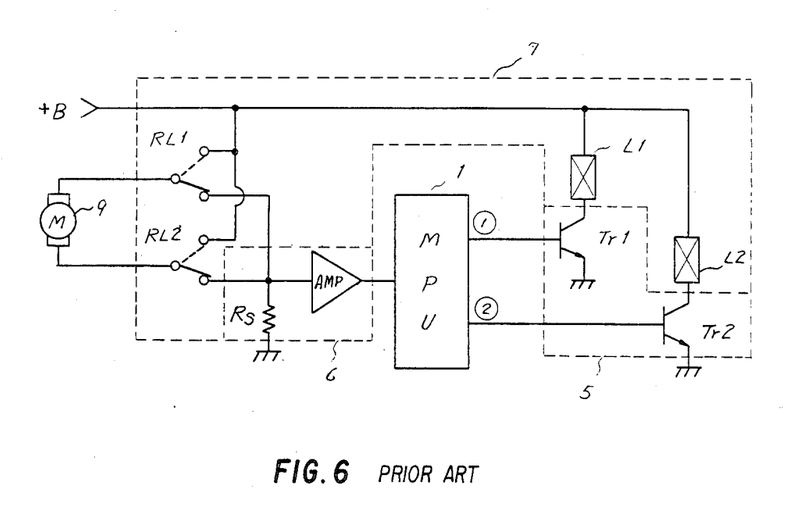
FIG. 6 is a detail view of a part of FIG. 1.
Figure 12A:
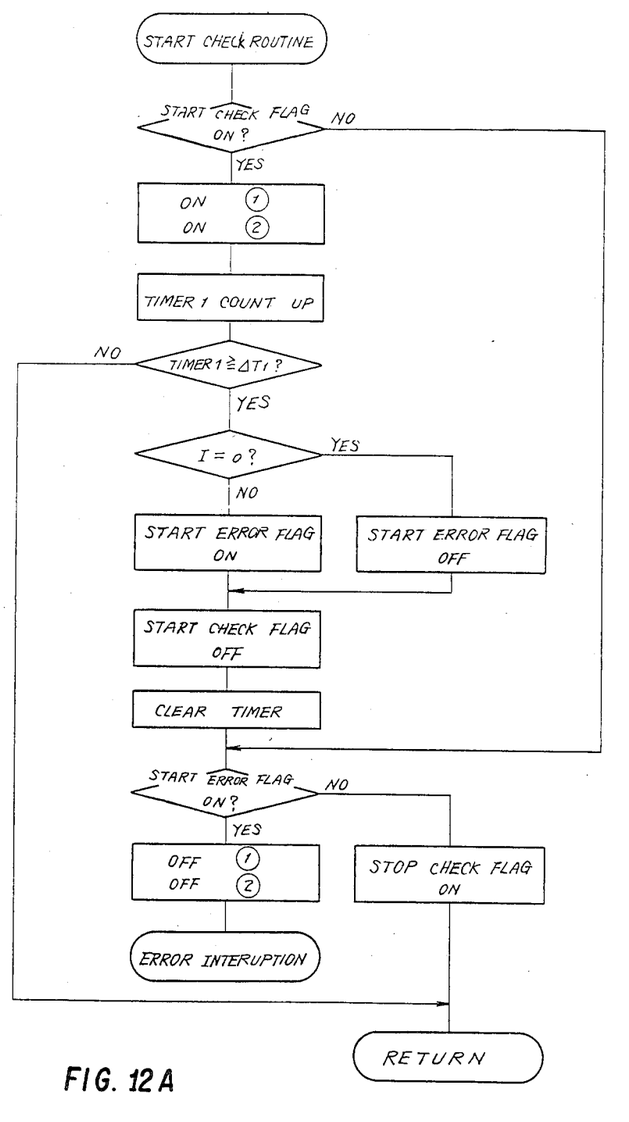
Figure 12B:
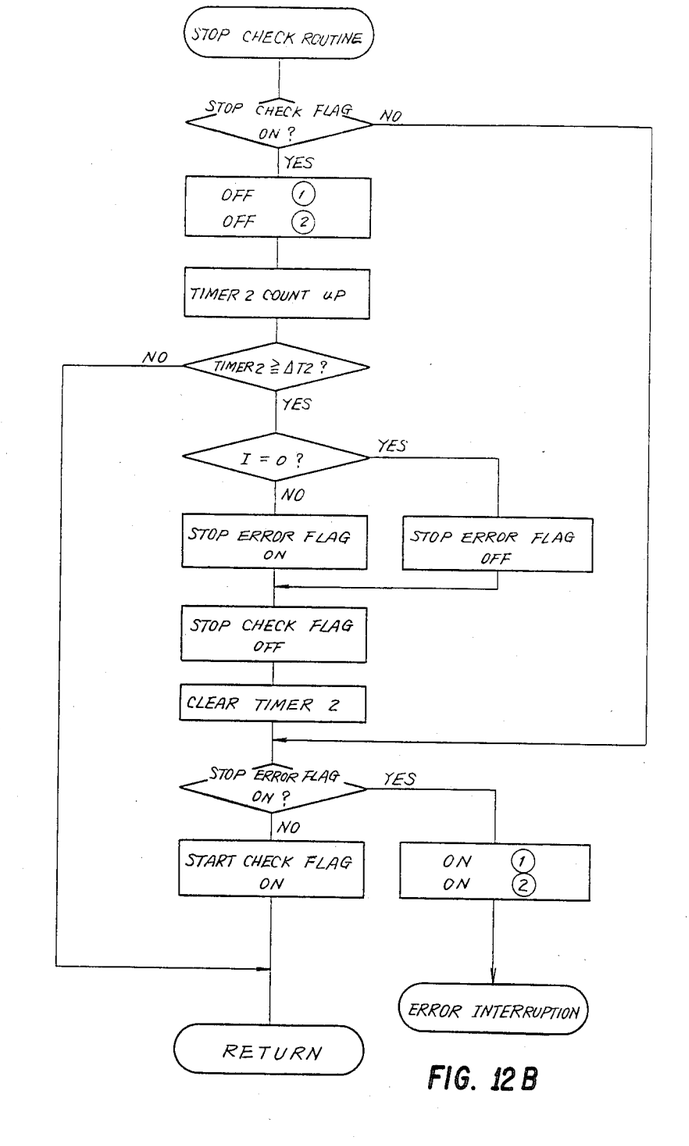

The steps 400 in FIG. 10(A) are subroutines for solving the fourth disadvantage explained for FIG. 6 to FIG. 8. The detail flow chart of START CHECK is shown in FIG. 12(A), while the detail flow chart of STOP CHECK is shown in FIG. 12(B). In order to execute these subroutines, the START CHECK FLAG which indicates necessity or no necessity of start check, the first timer region for determining the motor current check timing, the STOP CHECK FLAG region which indicates necessity or no necessity of stop check, the second timer region for determining the motor current check timing and the first and second error display flag regions for indicating the results of start check and stop check are assigned in the RAM 4. The functions of respective steps and functions of the subroutine as a whole are apparent from the figures and are not explained further. If an error is detected, an error interruption is generated and processing is transferred to the other error processing routine.

The step 300 of FIG. 10(A) for solving the third disadvantage determines whether motor current value I is smaller than a lower limit value $I_g$ or not in the period (c) of FIG. 2. When it is smaller than $I_g$, the control is effectuated so that the motor is caused to stop.

Each timer in FIG. 10(B), FIG. 11, FIG. 12(A), FIG. 12(B) is respectively different.

As described above in detail, the reference value Ir for detecting motor failure is reset whenever the current I starts to increase. Therefore, an overload condition of the motor can always be detected in the shortest period. In the above example, a DC motor is used as the motor. In this case, the motor load is proportional to current and accordingly the motor has been explained to be monitored by its current value. However, if an AC motor is used, the monitoring of current and voltage permits calculation of effective power which is proportional to the load. Therefore it is possible for an AC motor to be used for motor control in the present invention.

The safety apparatus is required to always ensure fail-safe procedures, namely to make the control operation safe even when a part or component fails or any operation is carried out by a person. The present invention comprises a variety of fail-safe processings and assures highly reliable motor control and particularly the reliable operation of the safety control.

What is claimed is:

1. The method of controlling operation of an electric motor to change an operating condition of said motor upon the occurrence of an abnormal load condition comprising the steps of:

(a) initiating a timing means during periods of operation of said motor to establish a series of predetermined time periods ΔT;

(b) measuring current I applied to said motor during said periods of operation as a measure of load condition thereof;

(c) deriving an initial value Imin representative of load current at the beginning of each said time period ΔT;

(d) Adding a predetermined value ΔX to said value Imin to set a reference value Ir representative of said abnormal load condition;

(e) periodically measuring sucessive values of I at successive time intervals substantially shorter than time period ΔT;

(f) comparing said sucessive measured values of I with Ir and with said value Imin;

(g) if within a time period ΔT the value of I should decrease below said value Imin and then begin to increase, resetting said timing means to begin a new time period ΔT and setting a new reference value Ir; and (h) if within a time period ΔT the measure value I should increase to equal or exceed the value Ir, recognizing such increase as said abnormal load condition and initiating a change in operating condition of said motor in response thereto.

2. A motor control apparatus comprising:

an electric motor connectable to an electric power supply circuit to be driven thereby;

a manual switch for connecting said motor to said power supply circuit to drive said motor;

means for measuring a value I of current applied to said motor as a measure of load on said motor;

first clock means arranged to repeatedly measure a predetermined time period ΔT;

means responsive to said first clock means for adding a predetermined value ΔX to a value Imin measured at the beginning of each time period ΔT to set a reference value Ir;

means for storing said reference value Ir and said value Imin used to set said reference value Ir;

second clock means arranged to repeatedly generate signals to establish successive time intervals substantially shorter than time period ΔT;

first comparing means initiated by said second clock means signals for comparing measured values I at each said time interval with said stored value Imin and for detecting a condition when said measured values I begin to rise from a value equal to or less than said stored value Imin;

means responsive to detection of said condition for resetting said first clock means to begin a new time period ΔT and for resetting a new reference value Ir; and second comparing means initiated by said second clock means signals for comparing said measured values I at each said time interval with said stored reference value Ir to detect when said measured value I equals or exceeds said reference value Ir, and for actuating a control of said motor in response to said detection.

3. A motor control apparatus as recited in claim 2 further comprising:

means for calculating and storing a second reference value Ir' which is smaller than Ir by a predetermined value;

third comparing means for comparing said second reference value Ir' with said measured value I at each said time interval to detect a condition wherein said measured value I is greater than said second reference value Ir' and less than said reference value Ir and for disabling operation of said manual switch in response to said condition.

4. A motor control apparatus as recited in claim 2 further comprising:

a means for establishing and storing a value Ig significantly smaller than a normal operating current I of said motor;

fourth comparing means for comparing said measured value I with said value Ig; and means responsive to said fourth comparing means for stopping said motor when said measured value I is less than said value Ig.

5. A motor control apparatus as recited in claim 2 wherein:

said motor is a DC motor having first and second terminals, said electric power supply circuit includes a positive terminal and a negative terminal, and said control apparatus includes a first switching element for connecting said first motor terminal selectively to said positive and negative terminals and a second switching element for connecting said second motor terminal selectively to said positive and negative terminals whereby electric power supplied to said motor can be controlled to operate said motor alternatively in normal and reverse directions by connecting said motor terminals alternately to opposite ones of said positive and negative terminals; and fifth comparing means connected to said switching elements for detecting that an abnormal motor current I flows when said switching elements are both switched a same terminal of said power supply circuit; and means responsive to detection of such an abnormal motor current for stopping said motor by operating said switching elements to connect both said motor terminals to said power supply circuit terminal other than that at which said abnormal motor current is detected.

* * * * *